United States Patent
Liu et al.

(10) Patent No.: US 12,548,553 B1
(45) Date of Patent: Feb. 10, 2026

(54) TECHNIQUES FOR MACHINE LEARNING BASED PLAYBACK

(71) Applicant: Amazon Technologies, Inc., Seattle, WA (US)

(72) Inventors: Oliver Dayun Liu, Irvine, CA (US); Wenbin Ouyang, Redmond, WA (US); Sergio Elizondo Focil, Culver City, CA (US); Wondong Jang, Beverly Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 18/123,556

(22) Filed: Mar. 20, 2023

(51) Int. Cl.
   *G10L 15/26* (2006.01)
   *G10L 15/06* (2013.01)
   *H04N 21/488* (2011.01)

(52) U.S. Cl.
   CPC ............ *G10L 15/063* (2013.01); *G10L 15/26* (2013.01); *H04N 21/4884* (2013.01)

(58) Field of Classification Search
   None
   See application file for complete search history.

(56) References Cited

U.S. PATENT DOCUMENTS

| | | | |
|---|---|---|---|
| 12,032,155 B2* | 7/2024 | Croxford | G06F 3/011 |
| 2018/0047395 A1* | 2/2018 | Sommers | G06F 40/242 |
| 2018/0075659 A1* | 3/2018 | Browy | G02B 27/0172 |
| 2021/0050018 A1* | 2/2021 | Kim | G10L 15/02 |
| 2021/0233540 A1* | 7/2021 | Kim | G06F 3/167 |
| 2022/0020388 A1* | 1/2022 | Trim | H04M 3/568 |
| 2022/0148614 A1* | 5/2022 | Block | H04N 21/4884 |
| 2022/0238116 A1* | 7/2022 | Gao | G10L 17/02 |
| 2023/0290345 A1* | 9/2023 | Joshi | G06N 3/044 |
| 2023/0300399 A1* | 9/2023 | Stone | H04N 21/440236 |
| 2023/0412760 A1* | 12/2023 | Wang | G10L 15/04 |
| 2024/0371378 A1* | 11/2024 | Adya | G10L 15/063 |

* cited by examiner

*Primary Examiner* — Neeraj Sharma
(74) *Attorney, Agent, or Firm* — Kilpatrick Townsend & Stockton LLP

(57) ABSTRACT

Techniques are described herein for providing variable length text during playback of a video. Audio corresponding to a portion of the video may be identified and segmented by a neural network. A number of captions of varying length can be identified for each segment using a second neural network. The user may be presented with a user interface that enables playback of various portions of the video (e.g., options corresponding to previously uttered sentences). During playback, one of the captions may be provided. Which caption is presented may be controlled by the user. At least some of these captions can be shorter than the actual words spoken during the segment, while still providing the same or substantially similar semantic meaning.

20 Claims, 8 Drawing Sheets

TECHNIQUES FOR MACHINE LEARNING BASED PLAYBACK

BACKGROUND

It has been estimated that upwards of 2.4 million people in the United States experience both hearing and vision losses. Communicating with others via video-based chat systems is especially difficult for these individuals. Even with advances in technology, conventional video chat systems still fall short in providing an effective solution to address these communication difficulties. The disclosed techniques address these deficiencies individually and collectively.

BRIEF DESCRIPTION OF THE DRAWINGS

Various embodiments in accordance with the present disclosure will be described with reference to the drawings, in which.

DETAILED DESCRIPTION

Figure 1:
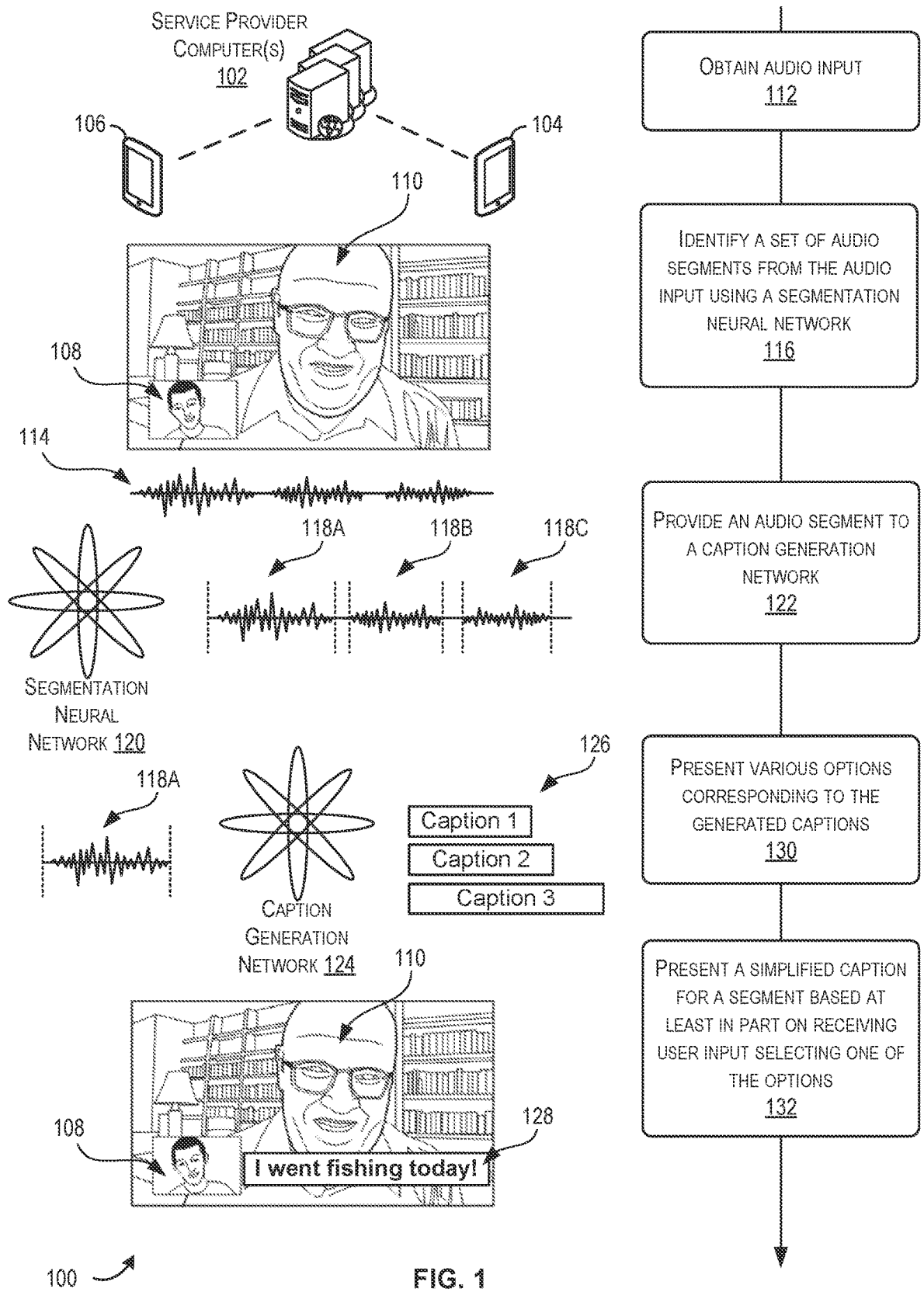
FIG. 1 is an example flow for providing a machine learning based playback system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details Furthermore, well-known features may be omitted or simplified in order not to obscure the embodiment being described.

Some conventional systems use automated speech-to-text algorithms with audio to generate and display a caption of the audio. However, these approaches are not ideal for users you have slower response speed than average and require more time to process auditory or written information. For example, elderly users may be able to hear and/or read to some extent but might use reading glasses and/or hearing aids. Glasses and/or hearing aids make hearing and/or reading potentially slower than users who possess better vision and/or hearing.

Techniques described herein are directed to machine-learning techniques for providing an improved playback system for audio and/or video which enables users to visually and/or auditorily reabsorb previously presented information. By way of example, a set of neural networks may be trained. The first neural network (e.g., a convolutional neural network) may be trained to identify segments (e.g., sentences, paragraphs, etc.) of audio provided as input. This audio may be standalone, or the audio may correspond to a portion of a video (e.g., a prerecorded video, video captured as part of a video chat session, etc.). The segments may correspond to previously uttered sentences provided by a speaker during the video/audio. Once identified by the first neural network, the audio segments may be provided to a second neural network (e.g., another convolutional neural network). The second neural network may be trained to generate one or more captions of varying length. One caption might transcribe every word of a given sentence, while another caption may include a shorter representation of that sentence. The generated captions may be configured to include the same or substantially similar semantic meaning as the previous uttered sentence. This enable the user to gain understanding of the speaker's meaning, while reducing the amount of information needing to be processed by the user. The user may select options corresponding to different previous-uttered sentences, repeat a last-played sentence, or modify the granularity and/or length of the provided captions.

By utilizing these techniques, the user can customize the playback experience to suit their individual needs. The user can select logical units of playback rather than blindly rewinding the video/audio, enabling the user to more quickly access the information they wish to view and in a form that allows them to absorb the maximum amount of information while spending minimum effort.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for providing a machine learning based playback system, in accordance with at least one embodiment. The operations may be performed with a service provider computer (e.g., service provider computer(s) 102) and two user devices (e.g., user devices 104 and 106), although any suitable number of one or more user device may be utilized, at interfaces hosted by the service provider computer and presented at the user device. Each of the user devices may be operated by a corresponding user such as user 108 (a speaker) and user 110 (a listener). In some embodiments, each user may alternate between speaking and listening as time goes on. By way of example, the users 108 and 110 may participate in a video chat session to converse.

The flow 100 may begin at 112, where audio input may be obtained. In the ongoing example, audio input may be obtained from the video chat session being conducted between users 108 and 110. A video including video and audio components may be obtained (e.g., incrementally obtained as time goes on) Some portion of the video (e.g., the last ten seconds of video, the last 5 seconds of video, etc.) may be utilized and corresponding audio may be extracted (e.g., audio 114).

At 116, a set of audio segments (e.g., audio segment 118A, 118B, and 118C, collectively referred to as "audio segments 118") may be identified from the audio input (e.g., audio 114). In some embodiments, the segmentation neural network 120 may be utilized to identify the segment 118. The segmentation neural network 120 may be a convolutional neural network, the training of which is discussed in further detail with respect to FIG. 2. In some embodiments, the segmentation neural network 120 may be previously trained to identify segments corresponding to a particular unit of speech (e.g., a sentence, two sentences, a phrase, a paragraph, etc.). In the ongoing example, the segments 118 correspond to the last n sentences uttered by a speaker (e.g., user 108).

At 122, an audio segment (e.g., audio segment 118A) may be provided to a caption generation network 124. By way of example, within the audio segment, the user 108 may say "Grandpa, I went fishing down at the lake today!" Caption generation network 124 may be a neural network (e.g., a convolutional neural network) the training of which will be discussed in further detail with respect to FIG. 3. The caption generations network 124 may be previously trained to identify a number of captions (e.g., 3, 5, 10, etc.) of varying word lengths. In some embodiments, the captions generated by the caption generation network 124 (e.g., captions 126) for audio segment 118A may be generated to include the same or substantially similar semantic meaning as the semantic meaning of the words uttered within the audio segment 118A. By way of example, caption 3 may include the text "Grandpa, I went fishing down at the lake today!" Caption 2 may include the text "I went fishing at the lake today!" Caption 1 may include the text "I went fishing today!"

At 130, a user interface may be provided to present various options corresponding to the captions 126 generated at 122. An example user interface is discussed in more detail in connection with FIG. 5 below. The options enable the user 110 to select granularities with respect to the captions provided at the interface. One level corresponding to one caption may provide an exact, or near exact, transcription of the words spoken in the audio segment while another caption may correspond to a simplified caption that conveys a similar meaning in fewer words then the number of words used in the utterance.

At 132, a simplified caption (e.g., caption 1) for the audio segment (e.g., audio segment 118A) may be presented at a user interface based at least in part on receiving user input that selects one of the options provided at 130. Should the user 110 wish to see a longer or shorter caption, additional options are provided to enable the user 110 to adjust the presented caption's length and/or granularity. In some embodiments, each caption may include different sets of words. Some of the captions may be a subset of the words of another caption, while others may include at least one different word than the spoken words uttered in the audio segment 118A. The operations performed between 112 and 132 may be performed any suitable number of times.

If the content (e.g., the video of the video chat session, in this example) is provided in real time, portions of the content can be incrementally provided to the neural networks such that the user interface provided to the user 110 (e.g., a listener) may refer to different utterances over time. By way of example, portions of the video corresponding to the video chat session may be incrementally provided and processed by the neural networks such that, as the video chat session is conducted, the user 110 has the ability to replay one or more of the previously uttered sentences, with or without an exact or shortened/simplified caption.

By utilizing the techniques discussed herein, the listening entity (e.g., user 110) can more readily access information in which he has interest (e.g., the last n sentences uttered by user 108). The disclosed user interfaces provide for easy, and straight forward navigation for units of speech that are often utilized by users (e.g., sentences). These techniques enable more effective communication. A speaker (e.g., user 108) might not notice the user 110 is having hearing difficulty, or at least it may not be readily apparently what the supposed problem is. The techniques disclosed herein may not only enable the listener (e.g., user 110) to absorb information in an improved manner, but also provide a notification to user device 106 (e.g., a user device associated with the user 108) that at least one caption or word is not understood by the recipient user.

Figure 2:
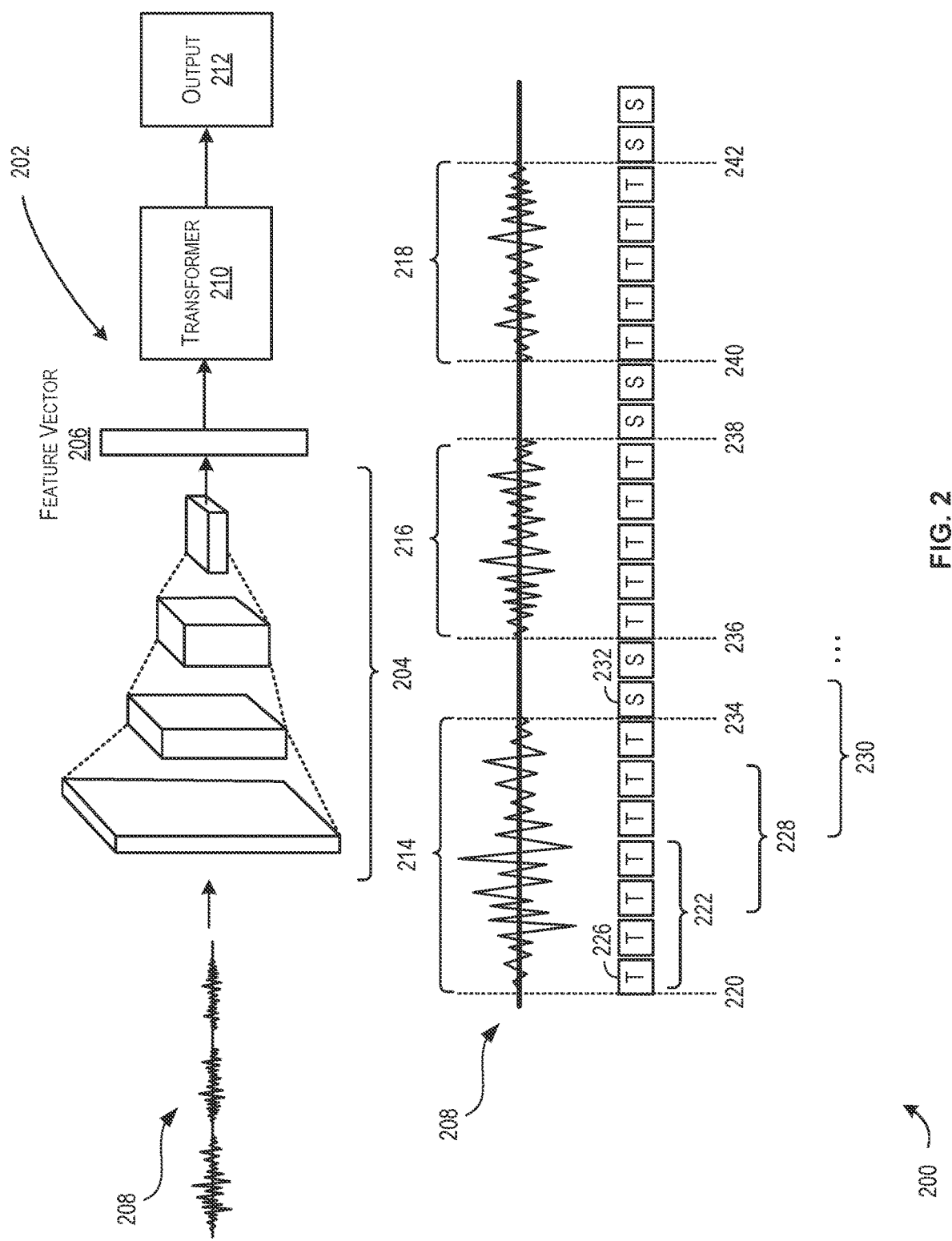
FIG. 2 is an example block diagram illustrating techniques for machine learning based segmentation of audio, in accordance with at least one embodiment.

FIG. 2 is an example block diagram 200 illustrating techniques for machine learning based segmentation of audio, in accordance with at least one embodiment. FIG. 2 depicts the training and utilization of segmentation neural network 202 (an example of the segmentation neural network 120 of FIG. 1). As depicted the segmentation neural network 202 may be convolutional neural network including any suitable number of layers 204. Convolutional neural networks are a class of deep neural networks that may be used to identify patterns in images, natural language processing, signal processing and the like. Layers 204 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Segmentation neural network 202 may be configured to generate feature vector 206 from input 208 by passing input 208 incrementally through layers 204. Input 208 may be an example of audio 114 of FIG. 1). In some embodiments, input 208 may include audio corresponding to a portion of video (e.g., 15 seconds worth of audio corresponding to the last 15 second of video of a video chat session between two users). In some embodiments, input 208 may be, or include, an audio mel spectrogram representing a portion of audio (e.g., audio 114) of a video chat session. An audio mel spectrogram may provide frequencies found in the audio as converted to a mel scale. In some embodiments, the mel spectrogram may be obtained using a Fourier transform function that converts an audio signal in a time domain and outputs the corresponding frequencies.

Transformer 210 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value). In some embodiments, transformer 210 may be configured to process sequential data. By way of example, sub-portions of the input 208 may be individually processed through layers 204 to generate feature vector 206. Transformer 210 may be configured to classify (through processing the feature vector 206 through one or more additional layers as including, or not including speech. The transformer 210 may be configured to maintain a timestamp corresponding to the beginning of one speech segment. As the sub-portions of the input 208 are processed, the transformer 210 may be configured to identify when a sub-portion of the input 208 is encountered that does not include speech. When encountered, the transformer 210 may identify the start time of the non-speech portion as being the end time of the previous speech segment and may store a timestamp corresponding to the end time of the previous speech segment. Transformer 210 may then generate output 212 including the start time and end time timestamps for one speech segment of the input 208.

Although not depicted, the segmentation neural network 202 may include weights corresponding to each portion of a fully connected layer. These weights express connection strengths between each value and a corresponding category or classification. Additionally, the segmentation neural network 202 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, segmentation neural network 202 may be initialized with random or predefined weights. Through a training process, the segmentation neural network 202 may be trained to identify start times and end times for speech segments from audio input based at least in part on a training data set (not depicted) for which audio input and corresponding start/end timestamps for speech segments within the audio input are known. The audio input from an example of the training data set may be processed by the segmentation neural network 202 and the start/end timestamps produced for that example may be compared to the known start/end timestamps. Any error found between the start/end timestamps generated for that input and the known start/end timestamps may be used to modify the weights of the segmentation neural network 202. The process may be repeated any suitable number of times until error between the output produced by the segmentation neural network 202 is within a threshold of accuracy to known values. By way of example only, the segmentation neural network 202 may be trained and weights adjusted until output produced by the segmentation neural network 202 is within a threshold error, a threshold percentage of the time.

Once trained, segmentation neural network 202 may be used to identify speech segments (e.g., speech segments 214, 216, and 218 from input 208). In the example provided, the input 208 may be the first portion of a video chat session, and sub-portion 222 may be a particular portion of the video chat session (e.g., the first 10 second of the video chat session). Initially, a start time may be defaulted to a start time corresponding to 220 (e.g., runtime 0 corresponding to the beginning of the video chat session recording).

The segmentation neural network 202 may be configured to process incremental sub-portions of the input 208. By way of example, sub-portion 222 may be processed corresponding to approximately 0.43 total seconds of the input 208. It should be appreciated that each of sub-portions 222, 228, 230, and the like may be converted to a mel spectrogram of frequencies representing the frequencies of the input 208 within a given time window corresponding to each sub-portion. The segmentation neural network 202 may be configured to identify segments (e.g., segment 224) as containing speech (indicated with a "T"). Upon a next pass, the segmentation neural network 202 may classify segments of sub-portion 228 (each individually being classified as containing speech), followed by classifying segments of sub-portion 230 and so on until all of the input 208 has been classified and corresponding speech segments are identified. When segment 232 is identified (as not including speech, indicated by an "S"), the segmentation neural network 202 may be configured to store an end time corresponding to 234 in the input 208. The process may continue to identify start time 236 and end time 238 corresponding to speech segment 216 and start time 240 an end time 242 corresponding to speech segment 218. In some embodiments, if a speech segment is started in input 208, but not concluded within input 208, the segmentation neural network 202 may be configured to store the start time of input 208 for processing the next input (e.g., the next 10 seconds of the video chat session).

In this manner, the segmentation neural network 202 may identify timestamps corresponding to the start time and end time of each portion of the input 208 that comprises speech.

Figure 3:
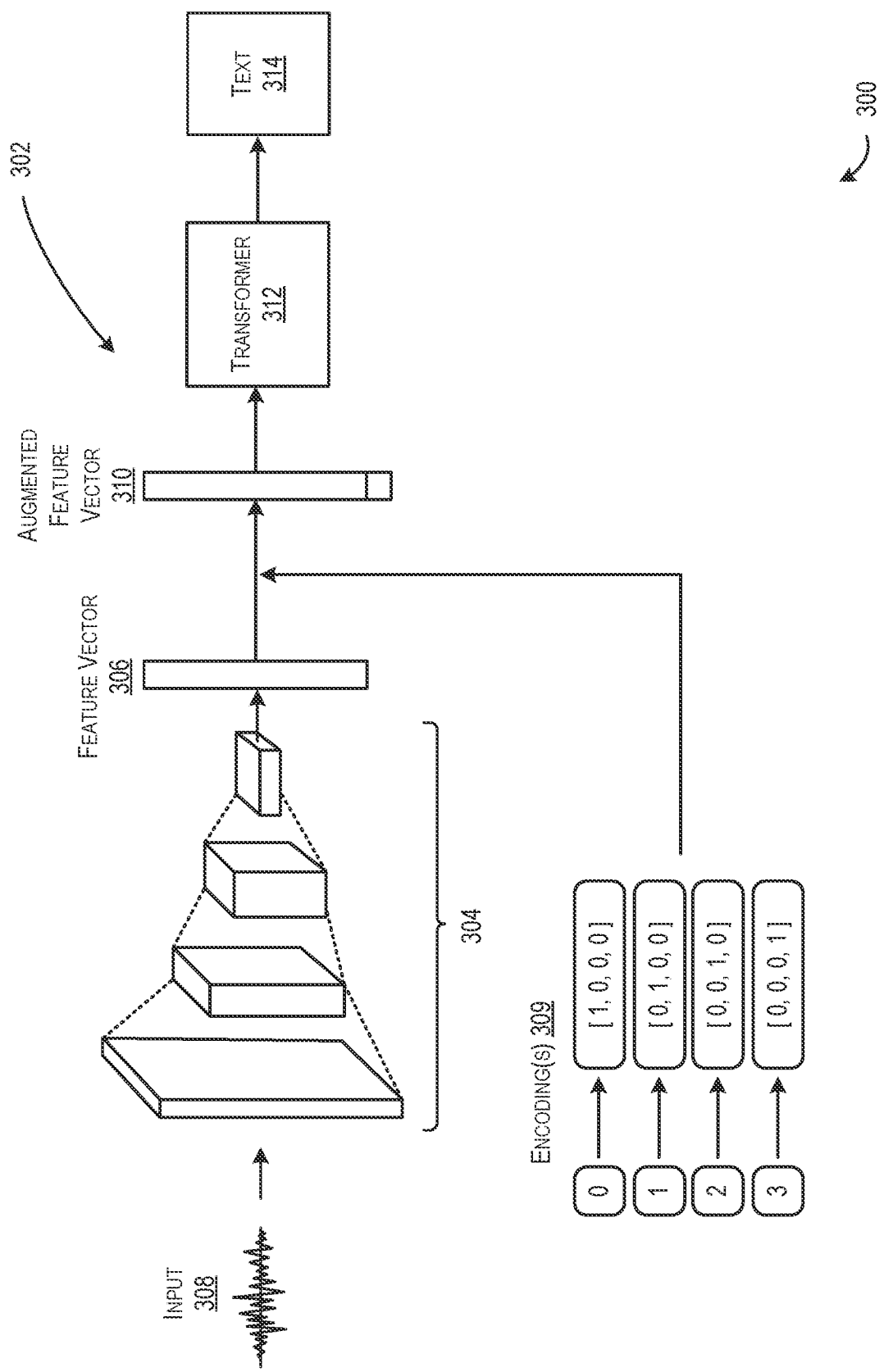
FIG. 3 is an example block diagram illustrating techniques for utilizing machine learning based techniques for generating variable length captions for audio, in accordance with at least one embodiment.

FIG. 3 is an example block diagram 300 illustrating techniques for utilizing machine learning based techniques for generating variable length captions for audio, in accordance with at least one embodiment. FIG. 3 depicts the training and utilization of caption generation network 302 (an example of the caption generation network 124 of FIG. 1). The caption generation network 302 may be convolutional neural network including any suitable number of layers 204. Convolutional neural networks are a class of deep neural networks that may be used to identify patterns in images, natural language processing, signal processing and the like. Layers 304 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Caption generation network 302 may be configured to generate feature vector 306 from input 308 by passing input 308 incrementally through layers 304. In some embodiments, input 308 may be generated based at least in part on start and end timestamps generated by the segmentation neural network 202 of FIG. 2. In some embodiments, input 308 may include audio and/or a mel spectrogram of the audio corresponding to the speech segment 214. In some embodiments, input 308 may be, or may include, an audio mel spectrogram representing a portion of audio (e.g., audio 114) of a video chat session. In some embodiments, the mel spectrogram may be obtained using a Fourier transform function that converts an audio signal of speech segment 214 in a time domain and outputs the corresponding frequencies for that segment.

In some embodiments, a one hot encoding (e.g., an example of encoding(s) 309) may be used to generate augmented feature vector 310. Each of the encoding(s) 309 may represent a desired caption length for the caption to be generated by caption generation network 302. In some embodiments, at least one of the encoding(s) 309 may represent an indication that the desired caption should be a direct transcription of the input 308 (e.g., to include every word uttered in input 308). At least one of the encoding(s)

309 may represent a number of words to be included in the shortened caption regardless of the number of words uttered in input 308. By way of example, one encoding (e.g., encoding 2, corresponding to a vector [0, 0, 1, 0]) may indicate that a three-word caption is desired. In general, each encoding may specify a corresponding complexity and/or length of the desired caption. The encoding selected from encoding(s) 309 may be appended to the feature vector 306 to generate augmented feature vector 310. In some embodiments, this portion of the process may be performed any suitable number of times. By way of example, each of the encoding(s) 309 may be appended to a different instance of feature vector 306 to generate corresponding augmented feature vectors that may serve as input to transformer 312.

Transformer 312 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value). In some embodiments, transformer 312 may be configured to process sequential data. By way of example, sub-portions of the input 308 may be individually processed through layers 304 to generate feature vector 306 which may then be used to generate augmented feature vector 310. Transformer 312 may be configured to classify augmented feature vector 310 as containing one or more words. In some embodiments, the transformer 312 may be configured to identify a caption based on the identified words and the one hot encoding included in augmented feature vector 310. The transformer 312 may generated output corresponding to text 314. Text 314 may be an example of the captions 1-3 of FIG. 1 or the full/simplified captions described below in connection with FIG. 4.

Although not depicted, the caption generation network 302 may include weights corresponding to each portion of a fully connected layer. These weights express connection strengths between each value and a corresponding category or classification. Additionally, the caption generation network 302 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, caption generation network 302 may be initialized with random or predefined weights. Through a training process, the caption generation network 302 may be trained to identify a caption corresponding to a given length or complexity for audio input (e.g., a speech segment of FIG. 2, a mel spectrogram of a speech segment, etc.) based at least in part on a training data set (not depicted) for which inputs, caption lengths/complexities, and corresponding captions are known. In some embodiments, a training data example my include an input (e.g., an audio, a mel spectrogram of the audio, etc.) and one or more captions each corresponding to a particular caption/length complexity (as indicated by a corresponding one hot encoding from encoding(s) 309). An input example of the training data set may be processed by the caption generation network 302 and a caption corresponding to the included encoding of encoding(s) 309 may be compared to the known caption for the example. Any error found between the caption generated for that input and the known caption (e.g., a caption corresponding to the same length/complexity as indicated by the input's included encoding) may be used to modify the weights of the caption generation network 302. The process may be repeated any suitable number of times until error between the output produced by the caption generation network 302 is within a threshold of accuracy to known values By way of example only, the caption generation network 302 may be trained and weights adjusted until output produced by the caption generation network 302 is within a threshold error, a threshold percentage of the time (e.g., the captions generated are 95% accuracy at least 98% of the time).

Once trained, caption generation network 302 may be used to identify one or more captions for various speech segments (e.g., speech segments 214, 216, and 218 from input 208 of FIG. 2).

As a non-limiting example, each of the encoding(s) 309 may be individually appended to different instances of feature vector 306 to generate a corresponding augmented feature vector 310. The augmented feature vector 310 may be provided to transformer 312 to generate text 314 (a caption of a given length and/or complexity). Each of the captions generated (e.g., each instance of text 314 corresponding to individual encodings of encoding(s) 309) may be saved such that an input 308 (e.g., speech segment 214) may be associated with a variety of captions corresponding to different lengths and/or complexities.

Figure 4:
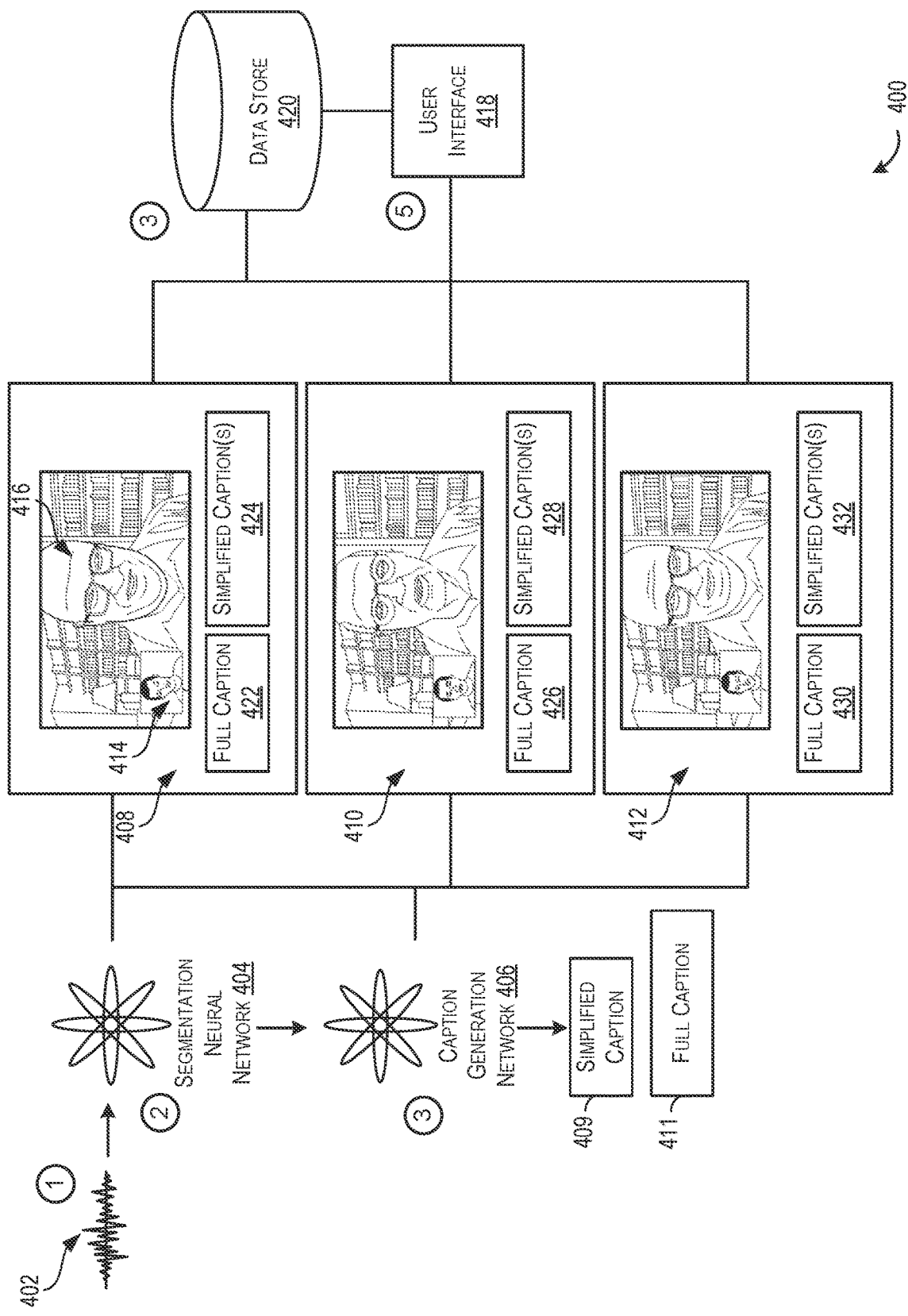
FIG. 4 is a block diagram illustrating an example flow for generating captions of varying granularity for audio using a number of neural networks, in accordance with at least one embodiment.

FIG. 4 is a block diagram illustrating an example flow 400 for generating captions of varying granularity for audio using a number of neural networks, in accordance with at least one embodiment. In some embodiments, the audio (e.g., audio 402) may be standalone, having no corresponding visual component or the audio 402 may be associated with a visual component. By way of example, the audio 402 could be an audio podcast. As another example, the audio may be obtained from video content. The video may be part of an ongoing video chat session, a prerecorded video, or the like. In some embodiments, the video and/or audio may be captured/obtained in an incremental manner as described in connection with FIG. 2. As depicted in FIG. 4, the audio 402 is obtained from a portion of video captured during a video chat session between two users. It should be appreciated that audio/video captures may be performed in any suitable environment, regardless of the number of users. Therefore, any suitable number of users may be involved. For example, 3, 5, or 7 users may be similarly involved in a video chat session, and the aforementioned techniques may be similarly applied in that environment.

At step 1, the audio 402 (e.g., a portion of the video chat) may be provided to segmentation neural network 404. Segmentation neural network 404 may be an example of the segmentation neural network 202 of FIG. 2. As discussed in FIG. 2, the audio 402 may correspond to video captured during the video chat session (e.g., the last 10 second of video, the last 5 seconds, etc.). It should be appreciated that in other examples, the audio 402 may be standalone and have no association to video. The audio 402, if obtained via video content, may be split from the video content prior to being provided to the segmentation neural network 404.

As a non-limiting example, audio 402 may include audio of any suitable duration (e.g., corresponding to the last 15 seconds of the video, the last 10 seconds of the video, etc.). The segmentation neural network 404, or another component, may transform the audio 402 into any suitable form (e.g., a mel spectrogram of frequencies representing the audio 402). Thus, audio 402 in this example may be, or may be considered to include, a mel spectrogram of frequencies or any suitable audio features generated from the audio 402.

At step 2, the segmentation neural network 404 may, utilizing the techniques described in connection with FIG. 2, output timestamps (e.g., corresponding to a start time and an end time) corresponding to each sentence identified within audio 402. As a non-limiting example, the audio 402 may include three full sentences corresponding the last three sentences uttered (e.g., by someone other than the listener) during the video chat session. In the example provided in FIG. 4, user 414 may be the speaker of these sentences and user 416 may be the listener. Each corresponding timestamp may be stored in data store 420 as part of a corresponding instance of sentence data. By way of example, sentence data 408, sentence data 410, and sentence data 412, may correspond to the last sentence uttered, the second to last sentence uttered, and the third to last sentence uttered by one user (e.g., the user 414, an example of user 108) in audio 402. It should be appreciated that utterances provided by the user (e.g., user 416) for which user interface 418 is being presented may be ignored In some embodiments, only audio corresponding to other users (e.g., users other than the user 416) may be used. In other embodiments, the utterances provided by user 416 may be discarded.

The timestamps identified by the segmentation neural network 404 and corresponding to the last sentence uttered, the second to last sentence uttered, and the third to last sentence uttered by user 414 may be stored in sentence data 408, sentence data 410, and sentence data 412, within data store 420. In some embodiments, an audio segment for each sentence may be generated from the audio 402 based at least in part on the identified time stamps. Each audio segment generated from the audio 402 may be stored in a corresponding instance of sentence data (e.g., sentence data 408, 410, and 412, respectively). If video content corresponding to the audio 402 is available, different video segments (including the corresponding audio for each segment) may be generated based at least in part on the time stamps identified by segmentation neural network 404 and stored in corresponding sentence data (e.g., sentence data 408, 410, and 412, for a respective video and/or audio segment corresponding to a respective sentence).

At step 3, the segments generated based at least in part on the time stamps identified at step 2 may be individually provided as input to caption generation network 406. Caption generation network 406 may be an example of the caption generation network 302 of FIG. 3. The input provided to caption generation network 406 may be a segment generated using the timestamps identified by segmentation neural network 404 (e.g., a speech segment corresponding to a single sentence such as speech segment 214 of FIG. 2) and/or a mel spectrogram of frequencies of that segment. Caption generation network 406 may be used to identify any suitable number of captions for each sentence using the techniques described in FIG. 3. By way of example, caption generation network 406 may identify simplified caption 409 and full caption 411. In some embodiments, full caption 411 may include a direct transcription of the words spoken in a sentence provided as input, while simplified caption 409 may include fewer and/or different words than the words spoken in the provided sentence. In some cases, the simplified caption 409 may maintain the same or substantially similar semantic meaning as the spoken sentence provided in the given audio segment. Any suitable number of simplified captions may be provided as output by the caption generation network 406.

Any suitable portion of the captions generated by the caption generation network 406 may be stored in the corresponding sentence data. By way of example, full caption 422 and simplified caption(s) 424 may be stored in sentence data 408; Full caption 426 and simplified caption(s) 428 may be stored in sentence data 410; Full caption 430 and simplified caption(s) 432 may be stored in sentence data 412.

A user interface (e.g., user interface 418) may be utilized at any suitable time to access the full caption, simplified caption(s), audio segment, or video segment associated with any of the instances of sentence data shown in FIG. 4 (e.g., sentence data 408, 410, and/or 412). An example of user interface 418 is provided in FIG. 5.

Figure 5:
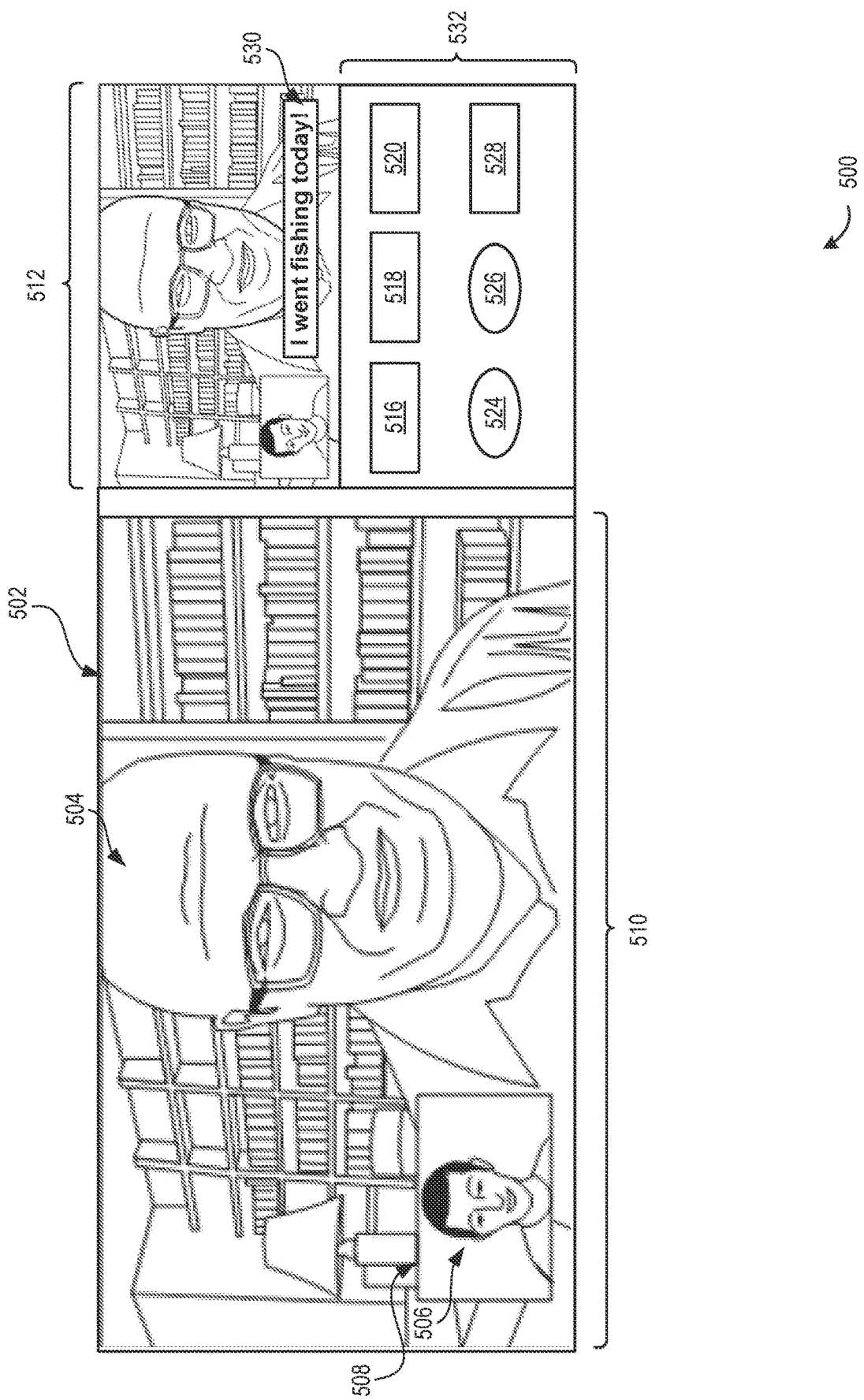
FIG. 5 is an example user interface configured to enable playback of video chat content with variable length captions, in accordance with at least one embodiment.

FIG. 5 is an example user interface 500 configured to enable playback of video chat content with variable length captions, in accordance with at least one embodiment. It should be appreciated that while FIG. 5 depicts an example in which video and audio is included in the content, a similar interface may be provided when content includes only audio.

In some embodiments, the user interface 500 includes window 502 for presenting real-time content. In the video chat session example, window 502 may present user 504 (an example of user 416 of FIG. 4) and user 506 (an example of user 414 of FIG. 4). The user 504 may be the user of the device on which user interface 500 is presented. The user 506 may be presented, as part of the video chat session, a similar interface in which users 504 and 506 are oppositely depicted (E.g., where user 506 is enlarged, and user 504 is depicted in window 508. In some embodiments, such as when video content is being replayed (e.g., from a previously recording), the user 504 may not be presented at all. Rather, in these cases, the speaker may be presented in window 510. In still further embodiments, when multiple users are listening to a speaker (e.g., either in real-time, or via a previous recording) the multiple users may be presented in window 510 within respective portions of window 510 (e.g., in respective instances of window 508). User interface 500 may include additional interface elements (not depicted) for navigating playback (e.g., such as playing, pausing, stopping, fast forwarding, rewinding, etc.).

In some embodiments, user interface 500 may include playback window 512. Playback window 512 may present video and/or audio corresponding to selections made with interface elements 516-528. As a non-limiting example, interface elements 516, 518, and 520 may correspond to any suitable number of previously uttered sentences. In some embodiments, the number of interface elements may be fixed (e.g., 3 as depicted, 4, 6, etc.). Each of the interface elements 516, 518, and 520 may correspond to a particular previous sentence uttered by user 506. As a non-limiting example, interface element 516 may correspond to the last sentence uttered by user 506, interface element 518 may correspond to the second to last sentence uttered by user 506, and interface element 520 may correspond to the third to last sentence uttered by user 506.

At any suitable time, user 504 may select interface elements 524 or 526. Interface element 524 may correspond to providing full captions (e.g., full captions 422, 426, and 430 of FIG. 4) for subsequent playback occurring in playback window 512. Interface element 524 may correspond to providing simplified captions (e.g., simplified caption(s) 424, 428, and 432 of FIG. 4) for subsequent playback occurring in playback window 512. One of interface elements 524 or 526 may be selected by default. By way of example, interface element 524 may be selected by default. Any selections of interface elements 516, 518, and 520 may be interpreted based at least in part on the selection of interface element 524 or 526. By way of example, if interface element 524 is selected, selection of 516 may provide the video and/or audio segment corresponding to the last sentence uttered by user 506 and a full caption (e.g., full caption 411 of FIG. 4, a direct transcription of each word uttered in that sentence) within playback window 512. Alternatively, if interface element 526 is selected prior to the selection of interface element 516, the video and/or audio segment corresponding to the last sentence uttered by user 506 and a simplified caption 530 (e.g., simplified caption(s) 424) may be presented at playback window 512. In some embodiments, while user 504 is utilizing the playback window 512 for playback, user 506 may be presented a notification of this fact. By way of example, during playback in playback window 512, user 506 may see a notification indicating that user 504 is playing back a previous sentence. As depicted, user 506 may select interface element 526, followed by interface element 516 to playback the video and audio corresponding to the last sentence uttered by user 506, with a simplified caption (e.g., simplified caption(s) 424) of "I went fishing today." As in the example provided in FIG. 1, the user 506 may have uttered "Grandpa, I went fishing down at the lake today!" Caption 530 may be a simplified caption generated by caption generation network 406 of FIG. 4 to include fewer words than actually uttered while maintaining the same semantic meaning as the words actually uttered.

It should be appreciated that additional interface elements similar to interface element 526 may be provided to enable the user 504 to select different lengths and/or complexities with respect to the captions provided in playback window 512. By way of example, a slider, edit bot, additional buttons, or the like, may be utilized in addition to, or in replace of the interface elements 524 and 526 to identify a complexity and/or length of caption (e.g., caption 530) provided in playback window 512.

In some embodiments, interface element 528 may correspond to a replay option in which, when selected, the last played sentence and corresponding caption may be replayed. In the ongoing example, after playing the last sentence uttered according to the selection of interface elements 526 and 516, selecting interface element 528 may result in the last sentence uttered by the user 506 to be once more replayed in playback window 512 with simplified caption 530. In some embodiments, the user 504 may select a different interface element (e.g., interface element 524) to modify the complexity and/or length of the caption provided and once more select interface element 528. After these selections, the last sentence uttered by the user 506 may be replayed, this time with the full caption corresponding to that video/audio segment.

Figure 6:
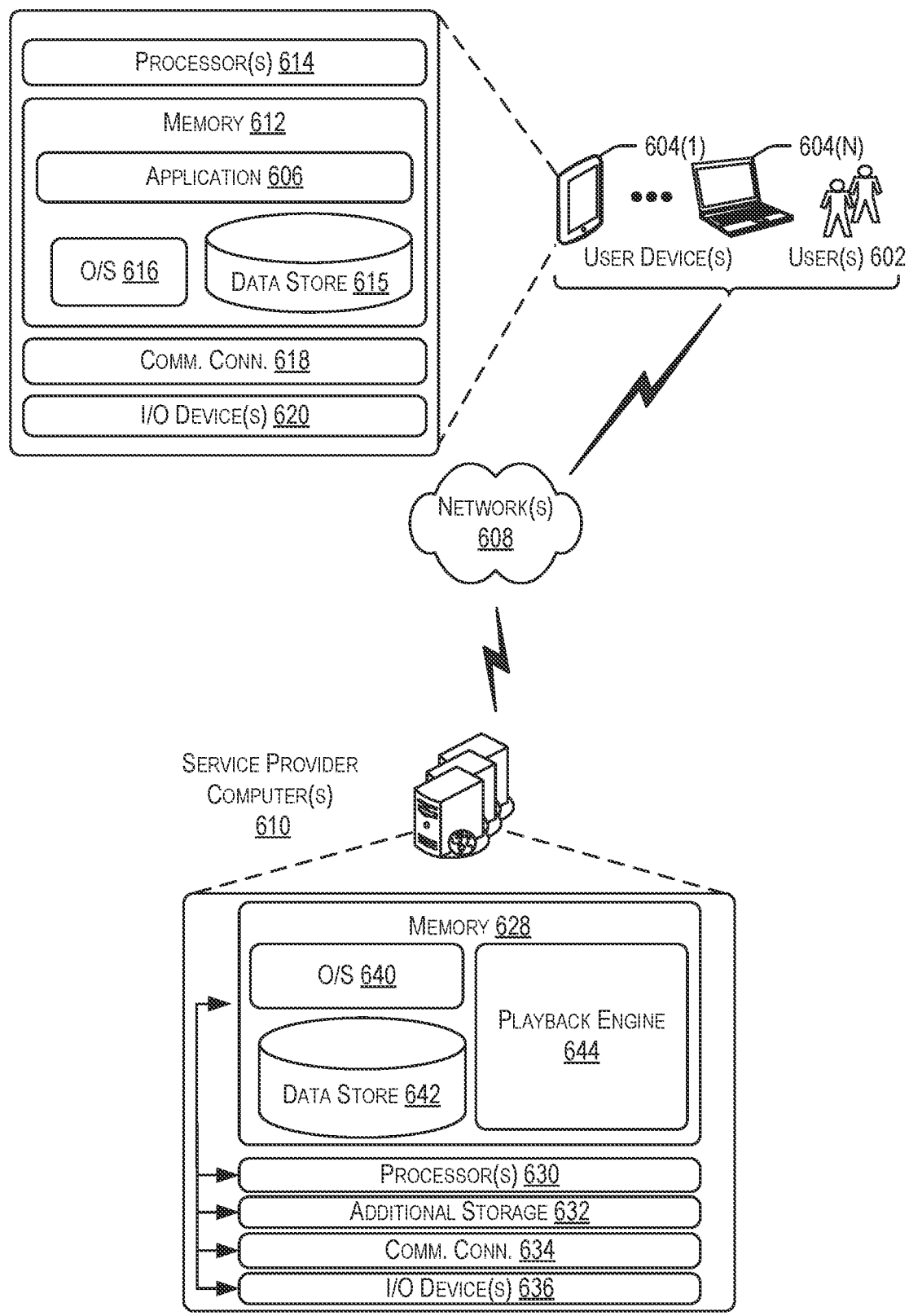
FIG. 6 illustrates components of a system, including a communication engine that may perform functions in accordance with at least one embodiment.

In some embodiments, the service provider computer(s) (e.g., service provider computer(s) 102 of FIG. 1, discussed in more detail with respect to FIG. 6) which host user interface 500 may select the appropriate video/audio segment and caption from data store 420 of FIG. 4 based at least in part on the selections made via interface elements 516-528.

In some embodiments, recording of the content of window 510 can be paused while playback is occurring in playback window 512. In some embodiments, the user 506 may be notified in window 510 with text or the like indicating that user 504 is replaying a previously uttered sentence. In some embodiments, if the user 504 replays the same video/audio segment, each time with the same or different length captions, the user 506 may be notified via window 510 that the particular sentence was not being understood.

In some embodiments, the service provider computers hosting user interface 500 may track replay activity of playback window 512. In some embodiments, the segments replayed and their corresponding sentence data (e.g., including a video and/or audio segment, timestamps corresponding to the segment from the original recording, full and/or simplified caption(s), and the like) may be stored (e.g., via data store 420 of FIG. 4). In some embodiments, the words corresponding to the full and/or simplified caption(s) may be stored in a list (referred to as a word list) or other suitable container. As the user 504 replays various segments, the resulting word lists corresponding to those segments may be compared. In some embodiments, if a common word occurs over a threshold number of times in the segments replayed by user 504, user 506 may be notified that the user 504 may be having difficulty hearing and/or understanding that word. This may provide user 506 with information that enables the user 506 to attempt communicating with a different word that may be easier for the user 504 to hear/understand and/or the user 506 could take action to clarify his use of the word to user 504 to avoid additional confusion and/or difficulty.

This type of "word monitoring" can be used in use cases in which a greater number of users are participating in the session. In some embodiments, if multiple users play back the same sentence and/or multiple users playback sentences having a common word (as identified by comparing word lists of those segments with one another), the user 506 (e.g., the speaker) can be notified that multiple users are having difficulty with that sentence and/or word. In some embodiments, when a greater number of users are participating in the video chat session for example, playback at any one user's playback window 512 may not cause a recording of window 510 to be paused. In some embodiments, when a greater number of users are participating in the video chat session, additional interface elements (not depicted) may be provided via playback window 512 or otherwise, to enable a given user to select a particular speaker. For example, should a third user take part in a video chat session with users 504 and 506, that user may be provided interface element(s) with which to select either user 504 or 506. In these scenarios, playback window 512 may be utilized to present different segments corresponding to user 504 or 506 and the selections of interface elements 532 may be applied to those different speakers based at least in part on which speaker was selected. In such examples, the user of the device on which user interface 500 is presented may be presented as user 504 is depicted (e.g., in an enlarged space of window 510) and user 504 may appear in a separate, but similar window as window 508 that is positioned in any suitable location of window 510.

FIG. 6 illustrates components of a system 600 according to a particular embodiment. In system 600, one or more user(s) 602 may utilize a user device (e.g., an example of user device 104 of FIG. 1, a user device of a collection of user device(s) 604 (1)-(N) (collectively, user device(s) 604). For example, the user(s) 602 may access a user interface (e.g., user interface 500 of FIG. 5) accessible through an application 606 (e.g., a web browser, an application configured to render user interfaces provided by the playback engine 644) running on the user device(s) 604 via one or more networks 608. In some embodiments, the application 606 operating on the user device(s) 604 may provide content that can be hosted, managed, and/or provided by a computing resources service or service provider, such as by utilizing one or more service provider computer(s) 610 (e.g., examples of the service provider computer(s) 102 of FIG. 1 and 218 of FIG. 2). The user(s) 602 may be provided various graphical user interface elements such as those described in connection to the figures above. In some embodiments, user input provided via these user interfaces may be transmitted by the application 606 to the playback engine 644, operating as part of service provider computer(s) 610.

In some examples, the networks 608 may include any one or a combination of many different types of networks, such as cable networks, the Internet, wireless networks, cellular networks, and other private and/or public networks. While the illustrated example represents the user(s) 602 accessing application functionality over the networks 608, the described techniques may equally apply in instances where the user(s) 602 interact with the service provider computer(s) 610 via the one or more user device(s) 604 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 610, perhaps arranged in a cluster of servers or as a server farm, may host the application 606 operating on the user device(s) 604 and/or cloud-based software services. Other server architectures may also be used to host the application 606 and/or cloud-based software services. The application 606 (e.g., a shopping application, a web browser, etc.) operating on the user device(s) 604 may be capable of handling requests from the user(s) 602 and serving, in response, various user interfaces that can be rendered at the user device(s) 604. The application 606 operating on the user device(s) 604 can present any suitable type of interface that supports user interaction, including video chat session, video/audio playback, real-time or prerecorded presentation of video and/or audio, or the like.

The user device(s) 604 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 604 may be in communication with the service provider computer(s) 610 via the networks 608, or via other network connections.

In one illustrative configuration, the user device(s) 604 may include at least one memory 612 and one or more processing units (e.g., processor(s) 614). The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random-access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random-access memory (SRAM), dynamic random-access memory (DRAM), or ROM.

Turning to the contents of the memory 612 in more detail, the memory 612 may include an operating system 616, one or more data stores 615, and one or more application programs, modules, or services for implementing the techniques disclosed herein, provided via the application 606. The application 606 may be configured to receive, store, and/or display a network page or other interface for interacting with the service provider computer(s) 610. Additionally, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 604 may also contain communications connection(s) 618 that allow the user device(s) 604 to communicate with a stored database, another computing device or server (e.g., the service provider computer(s) 610), user terminals and/or other devices on the networks 608. The user device(s) 604 may also include I/O device(s) 620, such as a keyboard, a mouse, a pen, a voice input device, a touch input device, a display, speakers, a printer, etc.

In some aspects, the service provider computer(s) 610 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user device(s) 604 and/or other service providers via the networks 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (e.g., processor(s) 630). The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile, or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server, user terminals and/or other devices on the networks 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services (e.g., the playback engine 644) for implementing the features disclosed herein. Playback engine 644 may be configured to perform the operations discussed above in connection with FIGS. 1-5. By way of example, playback engine 644 may train and/or access the networks 202 and 302 of FIG. 3, process audio and/or video in the manner discussed in connection with FIG. 4, and/or host the user interface 500 of FIG. 5. It should be appreciated that any suitable portion of the functionality of playback engine 644 may be provided, in whole or in part, at user device(s) 604 (e.g., as part of application 606). In some embodiments, the application 606 may host user interface 500 of FIG. 5, while the remaining operations discussed in connection with FIGS. 1-4 are provided by playback engine 644. In other embodiments, some or all of the functionality discussed in connection with FIGS. 1-4 may be provided at the user device(s) 604.

Figure 7:
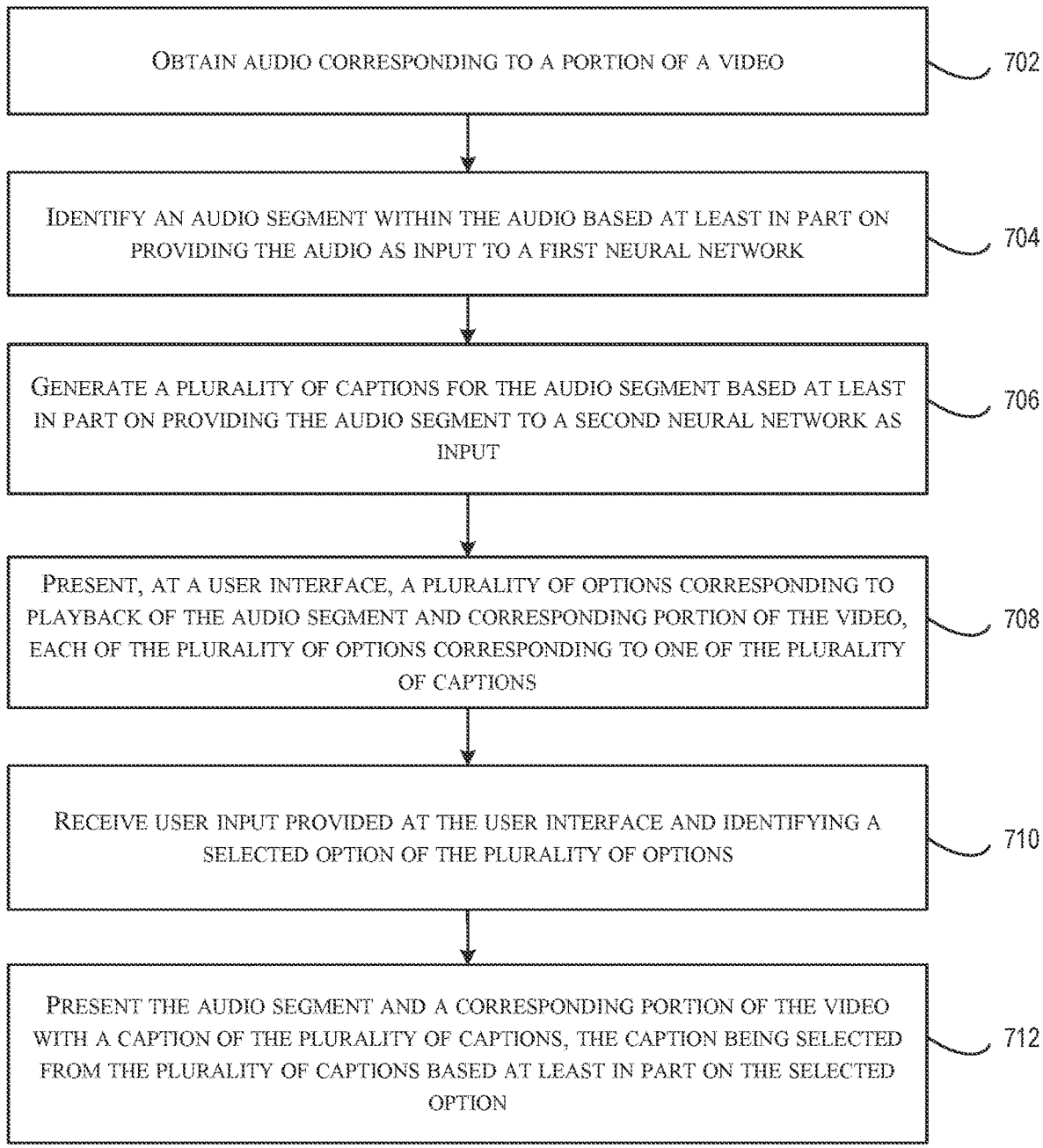
FIG. 7 is a flowchart illustrating an example method for providing one or more captions during video and/or audio playback, in accordance with at least one embodiment.

FIG. 7 is a flowchart illustrating an example method 700 for providing one or more captions during video and/or audio playback, in accordance with at least one embodiment. A computing device (e.g., a service provider computer) comprising one or more processors and one or more computer-readable mediums (e.g., one or more memories) may be utilized. A computer-readable medium may store computer-executable instructions that, when executed by at least one processor, causes the computing device to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the user device(s) 604 of FIG. 6 and/or the service provider computer(s) 610 of FIG. 6.

The method 700 may begin at 702, where audio corresponding to a portion of a video may be obtained. In some embodiments, the audio is standalone and does not necessarily correspond to a video. The video in this example may be a portion of a video chat session (e.g., a video chat session with two participants as depicted in FIGS. 1, 4, and 5. In some embodiments, the audio obtained may be a portion (e.g., the last 15 seconds, the last 10 seconds, etc.) of the video. Audio may be obtained incrementally as the video progresses such that the last 15 seconds, for example, may be obtained at a predetermined frequency (e.g., every 3 seconds, every 5 seconds, etc.).

At 704, an audio segment within the audio may be identified based at least in part on providing the audio as input to a first neural network (e.g., the segmentation neural network 120 of FIG. 1, the segmentation neural network 202 of FIG. 2, the segmentation neural network 404 of FIG. 4). In some embodiments, the first neural network may be a convolutional neural network that is configured to output a start time and an end time corresponding to each audio segment identified within the audio provided as input (the last 15 seconds of audio, for example). The audio segment (e.g., each audio segment) identified by the first neural network may correspond to a previously uttered sentence of one of the participants of the video chat session. The first neural network may be previously trained to identify, from audio input, one or more audio segments of the audio input that comprise speech. In some embodiments, multiple audio segments may be identified with the audio provided as input. By way of example, the first neural network may identify three sentences in the audio (e.g., corresponding to a last sentence uttered by a speaker, the second to last sentence uttered by the speaker, and a third to last sentence uttered by a speaker). In some embodiments, the sentences need not relate to the same speaker (in situations in which there are more than two users of the video chat session). However, in some embodiments, sentences spoken by one user (e.g., user 504 of FIG. 5, the user for which the captions are being provided) may be ignored or otherwise discarded. Thus, in some embodiments, the resulting audio segment(s) may include only sentences uttered by other users different from the one utilizing the interface at which captions will later be provided.

At 706, a plurality of captions for the audio segment may be generated based at least in part on providing the audio segment to a second neural network as input. The second neural network may be an example of the caption generation network 124 of FIG. 1, the caption generation network 302 of FIG. 3, and the caption generation network 406 of FIG. 4. In some embodiments, the second neural network may be configured to provide captions of varying complexity and/or lengths. In some embodiments, one caption identified by the second neural network may include every word uttered in the audio segment. In some embodiments, the second neural network may be configured to generated one or more simplified captions (e.g., the simplified caption(s) 424 of FIG. 4) for each audio segment. In some embodiments, the simplified captions may include fewer and/or different words than those actually uttered in the audio segment. However, the simplified captions may be generated to include the same or substantially similar semantic meaning as the words actually uttered in the audio segment.

At 708, a plurality of options corresponding to playback of the audio segment may be presented at a user interface (e.g., the user interface 500 of FIG. 5). In some embodiments, each of the plurality of options may correspond to one of the plurality of captions. By way of example, the user interface may provide options corresponding to playing back each of the last three sentences uttered (e.g., by another user). For example, the user interface may provide options similar to interface elements 516, 518, and 520 of FIG. 5 (e.g., options for replaying the last, the second to last, and the third to last sentences uttered by user 506 of FIG. 5).

At 710, user input provided at the user interface may be received. In some embodiments, the user input identifies a selected option of the plurality of options. By way of example, the user input may identify that interface element 524 of FIG. 5 was selected.

At 712, the audio segment and corresponding portion of the video may be presented with a caption of the plurality of captions generated by the second neural network. In some embodiments, the caption may be selected from the plurality of captions based at least in part on the selected option. By way of example, given the scenario in which interface element 524 was selected, the last sentence uttered by user 506 of FIG. 5 may be provided (also based at least in part on a default of playing the last uttered sentence). If additional interface elements (e.g., one of interface elements 516, 518, or 520) was selected, the particular sentence presented may be the same or different, depending on which interface elements were selected. In some embodiments, recording of the video chat session may be paused while play back is occurring.

As described above, the sentence data corresponding to the user input may be stored for later use. By way of example, historical data may be maintained which indicates historical user selections corresponding to various replayed segments, each replayed segment being associated with a corresponding set of captions. In some embodiments, words within each caption may be stored (e.g., in a word list, or other suitable container) and associated with the rest of the sentence data (e.g., the sentence data 408 of FIG. 4 including timestamps generated by segmentation neural network 404 of FIG. 4, a video and/or audio segment generated from the timestamps, any suitable number of captions generated by the caption generation network 406 of FIG. 4 for the audio segment, any suitable number of word lists corresponding to each caption, and the like). These word lists may be used to identify common words occurring in different sentence playbacks. In some embodiments, a notification can be presented to the speaker (e.g., user 506 of FIG. 5) if a common word occurs in more than a threshold number of sentences that have been played back (e.g., by the user 504, by any user other than the speaker/user 506, etc.).

Figure 8:
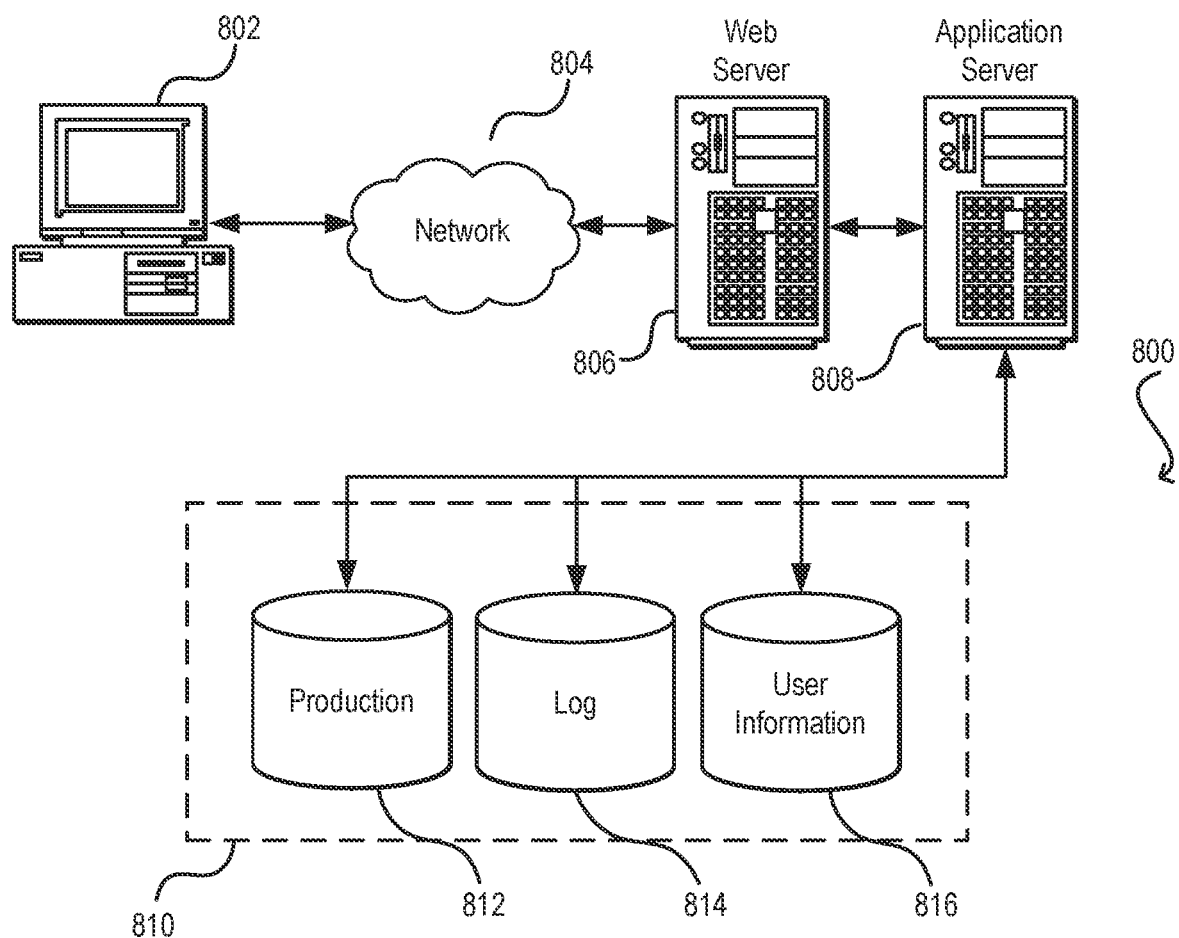
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes a user device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   training a first neural network using first supervised learning techniques and a first training data set to identify, from first audio provided as input, one or more audio segments of the first audio that comprise speech;
   training a second neural network using second supervised learning techniques a second training data set to identify, from second audio provided as input, two or more captions that correspond to differing representations of spoken words occurring within the second audio;
   obtaining audio corresponding to a portion of a video chat session;
   identifying, by the first neural network, a set of one or more audio segments within the audio based at least in part on providing the audio as input to the first neural network;
   identifying, by the second neural network, a set of captions for each audio segment of the set of one or more audio segments identified by the first neural network, the set of captions being identified based at least in part on providing each audio segment to the second neural network as input, each set of captions providing captions of differing length and content, at least one caption of the set of captions comprising different words than those spoken within a corresponding audio segment;
   presenting, at a user interface, a plurality of options corresponding to playback of a segment of the video chat session, each of the plurality of options corresponding to one of the set of captions;
   receiving, at the user interface, user input identifying a selected option of the plurality of options; and
   presenting, at the user interface, video and audio corresponding to the segment of the video chat session, the video and audio being presented with a caption of the set of captions, the caption being selected from the set of captions based at least in part on the selected option.

2. The computer-implemented method of claim 1, wherein the first neural network is a first convolutional neural network and wherein the second neural network is a second convolutional neural network.

3. The computer-implemented method of claim 1, wherein the first neural network is configured to output a start time and an end time corresponding to each audio segment identified within the first audio provided as input.

4. The computer-implemented method of claim 1, further comprising:
storing timestamp data corresponding to a subset of audio segments that are selected from the set of one or more audio segments;
presenting, at the user interface, a second set of options at the user interface, each of the second set of options corresponding to a respective audio segment of the subset of audio segments; and
receiving, at the user interface, additional user input selecting a particular option of the second set of options, the particular option corresponding to a particular audio segment of the subset of audio segments, wherein the set of captions are selected based at least in part on the particular audio segment selected.

5. The computer-implemented method of claim 1, wherein the caption presents different words than those spoken within the audio corresponding to the segment.

6. The computer-implemented method of claim 5, wherein the set of one or more audio segments individually correspond to a respective sentence of the audio.

7. The computer-implemented method of claim 5, further comprising:
maintaining historical data indicating historical user selections corresponding to various replayed segments, each replayed segment being associated with a corresponding set of captions;
identifying a common word occurring in the corresponding set of captions associated with two or more replayed segments; and
presenting a notification that a participant of the video chat session is lacking understanding of the common word.

8. A computing device, comprising:
a processor; and
a memory storing computer-executable instructions that, when executed by the processor, causes the computing device to:
obtain audio corresponding to a portion of audio content;
identify an audio segment within the audio based at least in part on providing the audio as input to a first neural network;
generate a plurality of captions for the audio segment based at least in part on providing the audio segment to a second neural network as input, at least one caption of the plurality of captions comprising different words than those spoken in the audio segment;
present, at a user interface, a plurality of options corresponding to playback of the audio segment, each of the plurality of options corresponding to one of the plurality of captions;
receive user input provided at the user interface and identifying a selected option of the plurality of options; and
present the audio segment with a caption of the plurality of captions, the caption being selected from the plurality of captions based at least in part on the selected option.

9. The computing device of claim 8, wherein the first neural network has been previously trained to identify, from audio input, one or more audio segments of the audio input that comprise speech, and wherein the second neural network has been previously trained to identify various captions respectively providing differing representations of spoken words occurring within the audio segment provided as input.

10. The computing device of claim 8, wherein the audio segment is a first audio segment and wherein executing the computer-executable instructions further causes the computing device to:
identify, using the first neural network, a second audio segment of the audio;
present a first option associated with the first audio segment, the first option corresponding to playing back a first portion of the audio corresponding to the first audio segment;
present a second option associated with the second audio segment, the second option corresponding to playing back a second portion of the audio corresponding to the second audio segment; and
receive additional user input at the user interface indicating a selection of the first option, wherein the plurality of captions from which the caption is selected are identified based at least in part on the additional user input indicating the selection of the first option.

11. The computing device of claim 10, wherein the first audio segment corresponds to a last-uttered sentence of the audio content, and wherein the second audio segment corresponding a sentence occurring immediately prior to the last-uttered sentence of the audio content.

12. The computing device of claim 8, wherein the audio is a component of a video, the video being captured as part of video content involving a first participant and a second participant, wherein the video and audio corresponding to the audio segment are presented at a first computing device corresponding to the first participant, and wherein presenting the video and audio corresponding to the audio segment at the first computing device causes a notification to be presented at a second computing device corresponding to the second participant, the notification indicating that playback has been initiated by the first participant.

13. The computing device of claim 8, wherein the audio content is occurring in real time and where a plurality of audio portions are incrementally processed by the first neural network and the second neural network over time.

14. The computing device of claim 13, wherein corresponding options presented at the user interface corresponding to different portions of the audio over time.

15. A non-transitory computer readable storage medium comprising one or memories storing computer-executable instructions that, when executed with one or more processors of a computing device, cause the computing device to:
identify an audio segment within audio corresponding to a portion of audio content based at least in part on providing the audio as input to a first neural network, the first neural network being previously trained to identify, from audio input, one or more audio segments comprising speech;
generate a plurality of captions for the audio segment based at least in part on providing the audio segment to a second neural network as input, the second neural network being previously trained to identify various captions respectively providing differing representations of spoken words occurring within the audio segment, at least one caption of the plurality of captions comprising different words than those spoken within the audio segment;
present, at a user interface, a plurality of options corresponding to playback of the audio segment, each of the plurality of options corresponding to one of a plurality of caption lengths;
receive, at the user interface, user input identifying a selected option of the plurality of options; and present playback of the audio segment with a caption of the plurality of captions, the caption being selected from the plurality of captions based at least in part on the selected option.

16. The non-transitory computer readable storage medium of claim 15, wherein the audio content comprises three or more participants, wherein one participant is notified, via a second interface, that playbacks initiated by two or more participants share a common trait.

17. The non-transitory computer readable storage medium of claim 15, wherein recordation of the audio content is paused while playback of the audio segment is occurring.

18. The non-transitory computer readable storage medium of claim 15, wherein at least one caption length of the plurality of caption lengths relates to a particular caption that includes every word of the audio segment.

19. The non-transitory computer readable storage medium of claim 15, wherein the caption is generated to maintain a semantic meaning of corresponding spoken words occurring within the audio segment, while providing written words that differ from the corresponding spoken words occurring within the audio segment.

20. The non-transitory computer readable storage medium of claim 19, wherein the second neural network is trained utilizing a training data set comprising respective audio segments and a corresponding caption of a particular length, and wherein the training data set comprises multiple captions of varying lengths for a given audio segment.

* * * * *